(12) United States Patent
Kwon et al.

(10) Patent No.: US 8,410,240 B1
(45) Date of Patent: Apr. 2, 2013

(54) POLYCARBONATE AND METHOD OF PREPARING THE SAME

(75) Inventors: O Sung Kwon, Uiwang-si (KR); Jun Ho Chi, Uiwang-si (KR); Jong Chan Hur, Uiwang-si (KR); Chang Heon Lee, Uiwang-si (KR); Bok Nam Jang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/328,138

(22) Filed: Dec. 16, 2011

(30) Foreign Application Priority Data

Sep. 30, 2011 (KR) .................. 10-2011-0099850

(51) Int. Cl.
*C08G 64/00* (2006.01)
*C08G 63/02* (2006.01)
(52) U.S. Cl. ........ 528/196; 524/588; 524/589; 524/590; 528/198; 528/204
(58) Field of Classification Search .............. 524/588, 524/589, 590; 528/196, 198, 204
See application file for complete search history.

(56) References Cited

U.S. PATENT DOCUMENTS

| | | | |
|---|---|---|---|
| 5,401,826 A | 3/1995 | Sakashita et al. | |
| 7,848,025 B2 * | 12/2010 | Hatano et al. | 359/642 |
| 7,879,967 B2 * | 2/2011 | Ebert et al. | 528/26 |
| 2008/0015289 A1 | 1/2008 | Siripurapu | |

FOREIGN PATENT DOCUMENTS

| | | |
|---|---|---|
| JP | 05-339390 A | 12/1993 |
| KR | 2007-0071446 A | 7/2007 |
| KR | 2009-0026359 A | 3/2009 |
| KR | 2010-0022376 A | 3/2010 |

* cited by examiner

*Primary Examiner* — Terressa Boykin
(74) *Attorney, Agent, or Firm* — Summa, Additon & Ashe, P.A.

(57) ABSTRACT

Polycarbonate includes repeat units represented by Formula 1, Formula 2 and Formula 3, respectively:

[Formula 1]

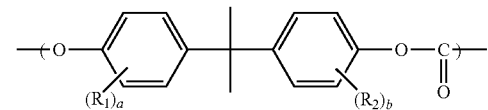

[Formula 2]

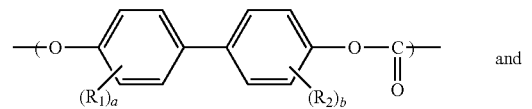

and

[Formula 3]

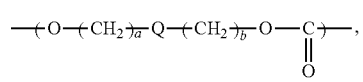

wherein: $R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, a and b are the same or different and are each independently an integer from 0 to 4, and Q is substituted or unsubstituted C5 to C10 cycloalkyl.

19 Claims, No Drawings

POLYCARBONATE AND METHOD OF PREPARING THE SAME

CROSS-REFERENCE TO RELATED APPLICATION

This application claims priority under 35 USC Section 119 to and the benefit of Korean Patent Application No. 10-2011-0099850 filed on Sep. 30, 2011, the entire disclosure of which is incorporated herein by reference.

FIELD OF THE INVENTION

The present invention relates to polycarbonate and a method of preparing the same.

BACKGROUND OF THE INVENTION

Polycarbonate resin is a thermoplastic material that has a heat deflection temperature of about 135° C. or higher and can exhibit superior mechanical properties including impact resistance and excellent self-extinguishing properties, dimensional stability, heat resistance and transparency. Polycarbonate resins are widely used in various applications, such as exterior materials of electronic and electric products, automobile components, and the like.

However, despite excellent transparency and mechanical properties, polycarbonate has limitations in use for exterior materials. When a plastic material is used as an exterior material, the product is often coated to enhance the aesthetics thereof. In this case, a dye diluted with various organic solvents can be applied to the surface of a molded resin article and dried. The organic solvents used as diluents can penetrate into the polycarbonate, which can decrease transparency and mechanical strength. Thus, in order to use polycarbonate in products frequently exposed to various organic solvents in the course of use, it is important for the polycarbonate to have resistance against these organic solvents.

KR Patent Publication No. 2007-0071446, KR Patent Publication No. 2009-0026359 and KR Patent Publication No. 2010-0022376 disclose methods of improving chemical resistance of polycarbonate resins by blending with other resins having chemical resistance. However, while these methods can slightly improve chemical resistance, they can decrease impact resistance. In order to improve impact resistance reduced due to blending, an impact modifier can be used. The impact modifier, however, can significantly decrease transparency of the resin.

JP 05-339390 and U.S. Pat. No. 5,401,826 disclose methods of improving chemical resistance by preparing copolymerized polycarbonate in which a material having chemical resistance is introduced into a conventional polycarbonate resin.

An example of the copolymerized material is 4,4'-bisphenol, which is copolymerized with a polycarbonate resin to improve chemical resistance. However, although 4,4'-bisphenol can improve chemical resistance, it also can reduce impact resistance, thereby deteriorating advantages of the polycarbonate. In particular, as the amount of 4,4'-bisphenol used increases, fluidity drastically decreases, causing deterioration in moldability.

SUMMARY OF THE INVENTION

The present invention provide polycarbonate that can have excellent chemical resistance, fluidity, transparency and room-temperature/low-temperature impact strength without deterioration in impact resistance, and a method of preparing the same.

The polycarbonate includes repeat units represented by Formula 1, Formula 2, and Formula 3, respectively:

[Formula 1]

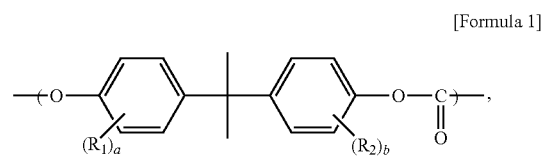

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4;

[Formula 2]

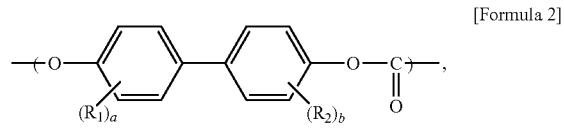

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4; and

[Formula 3]

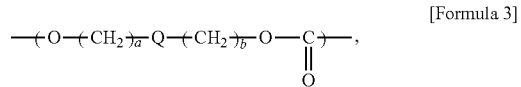

wherein:
Q is substituted or unsubstituted C5 to C10 cycloalkyl, and
a and b are the same or different and are each independently an integer from 0 to 4.

In one embodiment, the polycarbonate may have a mole ratio of Formula 1 (M1), Formula 2 (M2) and Formula 3 (M3) of about 30 to about 90 mol %: about 5 to about 30 mol %: about 5 to about 40 mol %.

In another embodiment, the polycarbonate may have a mole ratio of Formula 1 (M1), Formula 2 (M2) and Formula 3 (M3) of about 75 to about 90 mol %: about 5 to about 15 mol %: about 5 to about 15 mol %.

In a further embodiment, the polycarbonate may have a mole ratio of Formula 1 (M1), Formula 2 (M2) and Formula 3 (M3) of about 30 to about 80 mol %: about 10 to about 30 mol %: about 10 to about 40 mol %.

In one embodiment, the polycarbonate may have a mole ratio of Formula 1 (M1), Formula 2 (M2) and Formula 3 (M3) which satisfies the following conditions:

$M1 > M2 + M3$ and $M2 \leq M3$, wherein M1 is a mole ratio of Formula 1, M2 is a mole ratio of Formula 2 and M3 is a mole ratio of Formula 3.

In one embodiment, the polycarbonate may have a glass transition temperature of about 135 to about 160° C., an index of refraction of about 1.58 to about 1.59 and a notched IZOD impact strength of about 65 to about 95 kg·cm/cm, as measured on a ⅛" thick specimen at room temperature according to ASTM D256.

In another embodiment, the polycarbonate may have a notched IZOD impact strength of about 55 to about 85 kg·cm/cm, as measured on a ⅛" thick specimen at −30° C. according to ASTM D542.

The polycarbonate may include a sulfonic acid compound represented by Formula 4:

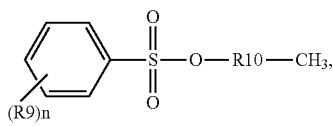

[Formula 4]

wherein
each $R_9$ is the same or different and each is independently substituted or unsubstituted C1 to C20 alkyl,
$R_{10}$ is substituted or unsubstituted C11 to C20 alkylene, and
n is an integer from 0 to 5.

The present invention also provides a method of preparing polycarbonate. The method includes transesterification of diols represented by Formula 1-1, Formula 2-1 and Formula 3-1 with diaryl carbonate:

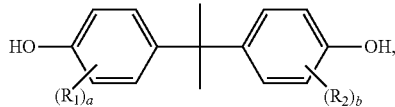

[Formula 1-1]

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b the same or different and are each independently an integer from 0 to 4;

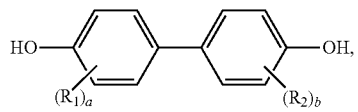

[Formula 2-1]

wherein:
$R_1$ and $R_2$ the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4; and

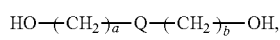

[Formula 3-1]

wherein:
Q is substituted or unsubstituted C5 to C10 cycloalkyl, and
a and b are the same or different and are each independently an integer from 0 to 4.

In one embodiment, a mole ratio of Formula 1-1, Formula 2-1 and Formula 3-1 may be about 30 to about 90 mol %:about 5 to about 30 mol %:about 5 to about 40 mol %.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Polycarbonate according to exemplary embodiments of the invention can be prepared by transesterification of diols represented by Formula 1-1, Formula 2-1 and Formula 3-1 with diaryl carbonate:

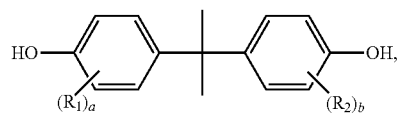

[Formula 1-1]

wherein:
$R_1$ and $R_2$ the same or different and are each independently substituted or unsubstituted C1 to C6 alkyl, substituted or unsubstituted C3 to C6 cycloalkyl, substituted or unsubstituted C6 to C12 aryl or halogen, and
a and b the same or different and are each independently an integer from 0 to 4;

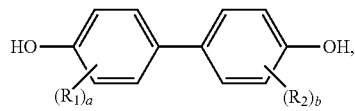

[Formula 2-1]

wherein:
$R_1$ and $R_2$ the same or different and are each independently substituted or unsubstituted C1 to C6 alkyl, substituted or unsubstituted C3 to C6 cycloalkyl, substituted or unsubstituted C6 to C12 aryl or halogen, and
a and b the same or different and are each independently an integer from 0 to 4; and

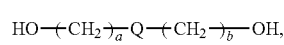

[Formula 3-1]

wherein:
Q is substituted or unsubstituted C5 to C10 cycloalkyl, and
a and b the same or different and are each independently an integer from 0 to 4.

As used herein, unless otherwise defined, the term "substituted" means that a hydrogen atom of a compound is substituted by a halogen atom, such as F, Cl, Br, and I, a hydroxyl group, a nitro group, a cyano group, an amino group, an azido group, an amidino group, a hydrazino group, a hydrazono group, a carbonyl group, a carbamyl group, a thiol group, an ester group, a carboxyl group or salt thereof, a sulfonic acid group or salt thereof, a phosphate group or salt thereof, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof.

Examples of Formula 1-1 may include without limitation 2,2-bis-(4-hydroxyphenyl)-propane, 2,2-bis-(3,5-dimethyl-4-hydroxyphenyl)-propane, 2,2-bis-(3,5-diisopropyl-4-hydroxyphenyl)-propane, and the like, and combinations thereof. In exemplary embodiments, 2,2-bis-(4-hydroxyphenyl)-propane, also referred to as bisphenol A, may be used.

Examples of Formula 2-1 may include without limitation 4,4'-biphenol, 2,2'-dimethyl-4,4'-biphenyldiol, 3,3'-dimethyl-4,4-dihydroxybiphenyl, 2,2',6,6'-tetramethyl-4,4'-biphenol, and the like, and combinations thereof. In exemplary embodiments, 4,4'-biphenol may be used.

Examples of Formula 3-1 may include without limitation 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cycloheptanediol, 1,3-cycloheptanediol, 1,4-cycloheptanediol, 1,2-cyclooctanediol, 1,3-cyclooctanediol, 1,4-cyclooctanediol, and the like, and combinations thereof. In exemplary embodiments, 1,4-cyclohexanedimethanol may be used.

In one embodiment, a mole ratio of Formula 1-1, Formula 2-1 and Formula 3-1 may be about 30 to about 90 mol %: about 5 to about 30 mol %: about 5 to about 40 mol %.

In some embodiments, the mole ratio of a diol of Formula 1-1 may be 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the mole ratio of the diol of Formula 1-1 can be in a range from about any of the foregoing amounts to about any other of the foregoing amounts.

In some embodiments, the mole ratio of a diol of Formula 2-1 may be 5, 6, 7, 8, 9, 10, 11, 12, 13, 14, 15, 16, 17, 18, 19, 20, 21, 22, 23, 24, 25, 26, 27, 28, or 30 mol %. Further, according to some embodiments of the present invention, the mole ratio of the diol of Formula 2-1 can be in a range from about any of the foregoing amounts to about any other of the foregoing amounts.

In some embodiments, the mole ratio of a diol of Formula 3-1 may be 5, 6, 7, 8, 9, 10, 11, 12, 13, 14, 15, 16, 17, 18, 19, 20, 21, 22, 23, 24, 25, 26, 27, 28, 30, 31, 32, 33, 34, 35, 36, 37, 38, 39, or 40 mol %. Further, according to some embodiments of the present invention, the mole ratio of the diol of Formula 3-1 can be in a range from about any of the foregoing amounts to about any other of the foregoing amounts.

When the mole ratio of the diols of Formula 1-1, Formula 2-1 and Formula 3-1 is within this range, the polycarbonate may have a balance of physical properties including impact strength, chemical resistance and fluidity.

Examples of the diaryl carbonate may include without limitation diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, and the like, and combinations thereof. In exemplary embodiments, diphenyl carbonate can be used.

In one embodiment, the diols in Formula 1-1, Formula 2-1 and Formula 3-1 may be added in a mole ratio of about 0.6 to about 1.0, for example about 0.7 to about 0.9, to the diaryl carbonate. When the diols of Formula 1-1, Formula 2-1 and Formula 3-1 are added in a mole ratio within this range, excellent mechanical strength can be obtained.

In one embodiment, transesterification may be performed at a temperature of about 150 to about 300° C., for example about 160 to about 280° C., and as another example about 190 to about 260° C. under reduced pressure conditions. When the temperature is within this range, reaction rate can be appropriate and side reactions can decrease.

Further, transesterification may be performed under reduced pressure conditions at about 100 Torr or less, for example about 75 Torr or less, as another example about 30 Torr or less, and as another example about 1 Torr or less, for at least about 10 minutes or more, for example about 15 minutes to about 24 hours, and as another example about 15 minutes to about 12 hours. When the pressure and time are within these ranges, the reaction rate can be appropriate and side reactions can decrease.

In one embodiment, the reaction can be performed at a temperature of about 160 to about 260° C. for about 2 to about 9 hours, to prepare a polycarbonate resin.

Transesterification may be performed in the presence of a catalyst. Examples of the catalyst can include without limitation alkali metals, alkaline earth metals, and the like, and combinations thereof. Examples of the alkali and alkaline earth metals may include without limitation LiOH, NaOH, KOH, and the like, and combinations thereof. The amount of the catalyst may be determined based on the amount of the aromatic dihydroxy compound. In one embodiment, the catalyst may be present in an amount of about $1 \times 10^{-8}$ mol to about $1 \times 10^{-3}$ mol based on about 1 mol of the aromatic dihydroxy compound. When the catalyst is used in an amount within this range, sufficient reactivity can be obtained and generation of byproducts due to side reactions can be minimized, which can improve heat stability and color stability.

A sulfonic acid ester compound represented by Formula 4 or a mixture therewith may be added to the polycarbonate produced by the above reaction, which can remove remaining activity of the catalyst:

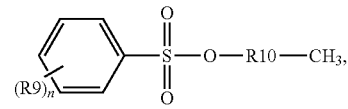

[Formula 4]

wherein:
each R9 is the same or different and each is independently substituted or unsubstituted C1 to C20 alkyl,
R10 is substituted or unsubstituted C11 to C20 alkylene, and
n is an integer from 0 to 5.

Examples of the sulfonic acid ester compound of Formula 4 may include without limitation dodecyl p-toluenesulfonate, octadecyl p-toluenesulfonate, dodecylbenzenesulfonate, octadecylbenzenesulfonate, and the like, and combinations thereof.

In one embodiment, the sulfonic acid ester compound may be present in an amount of about 0.0001 to about 0.001 parts by weight, for example about 0.0003 to about 0.0008 parts by weight, based on about 100 parts by weight of the monomer. When the sulfonic acid ester compound is present in an amount within this range, excellent heat stability and hydrolysis resistance can be obtained.

In one embodiment, a final polycarbonate may be prepared by in-situ reaction wherein the sulfonic acid ester compound is directly added to the polycarbonate obtained from the reaction. Alternatively, the polycarbonate obtained from transesterification and the sulfonic acid ester compound may be mixed in an extrusion process. In this embodiment, the polycarbonate produced by the reaction can be transferred to an extruder and the sulfonic acid ester compound can be added to the extruder, followed by extruding the mixture into pellets.

When adding the sulfonic acid ester compound, general additives may be added together and extruded. Examples of the additives may include without limitation flame retardants, antimicrobial agents, release agents, heat stabilizers, antioxidants, light stabilizers, compatibilizers, dyes, inorganic additives, fillers, plasticizers, impact modifiers, admixtures, coloring agents, stabilizers, lubricants, antistatic agents, pigments, weatherproofing agents, UV blocks, and the like, and combinations thereof.

The polycarbonate thus prepared can include repeat units represented by Formula 1, Formula 2 and Formula 3, respectively:

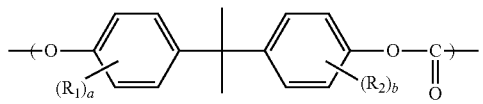
[Formula 1]

wherein:

$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and a and b are the same or different and are each independently an integer from 0 to 4;

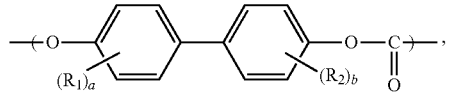
[Formula 2]

wherein:

$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and a and b are the same or different and are each independently an integer from 0 to 4; and

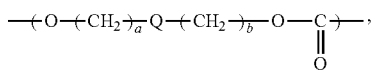
[Formula 3]

wherein:

Q is substituted or unsubstituted C5 to C10 cycloalkyl, and a and b are the same or different and are each independently an integer from 0 to 4.

In one embodiment, the polycarbonate may have a mole ratio of Formula 1 (M1), Formula 2 (M2) and Formula 3 (M3) of about 30 to about 90 mol %: about 5 to about 30 mol %: about 5 to about 40 mol %. In another embodiment, the polycarbonate may have a mole ratio of Formula 1 (M1), Formula 2 (M2) and Formula 3 (M3) of about 75 to about 90 mol %: about 5 to about 15 mol %: about 5 to about 15 mol %.

In some embodiments, the polycarbonate may include a unit of Formula 1 in an amount of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %. Further, according to some embodiments of the present invention, the amount of the unit of Formula 1 can be in a range from about any of the foregoing amounts to about any other of the foregoing amounts.

In some embodiments, the polycarbonate may include a unit of Formula 2 in an amount of 5, 6, 7, 8, 9, 10, 11, 12, 13, 14, 15, 16, 17, 18, 19, 20, 21, 22, 23, 24, 25, 26, 27, 28, or 30 mol %. Further, according to some embodiments of the present invention, the amount of the unit of Formula 2 can be in a range from about any of the foregoing amounts to about any other of the foregoing amounts.

In some embodiments, the polycarbonate may include a unit of Formula 3 in an amount of 5, 6, 7, 8, 9, 10, 11, 12, 13, 14, 15, 16, 17, 18, 19, 20, 21, 22, 23, 24, 25, 26, 27, 28, 30, 31, 32, 33, 34, 35, 36, 37, 38, 39, or 40 mol %. Further, according to some embodiments of the present invention, the amount of the unit of Formula 3 can be in a range from about any of the foregoing amounts to about any other of the foregoing amounts.

When the polycarbonate includes a mole ratio of the units of Formula 1 (M1), Formula 2 (M2) and Formula 3 (M3) within this range, the polycarbonate can exhibit excellent fluidity, impact strength and chemical resistance, and particularly can obtain superior heat resistance and impact strength at room temperature. Further, the polycarbonate may secure a low index of refraction, thereby obtaining excellent compatibility with other resins when mixed therewith. In exemplary embodiments, the polycarbonate may have a glass transition temperature of about 135 to about 160° C., an index of refraction of about 1.58 to about 1.59 and a notched IZOD impact strength of about 65 to about 95 kg·cm/cm, as measured on a ⅛" thick specimen at room temperature according to ASTM D256.

In a further embodiment, the polycarbonate may have a mole ratio of Formula 1 (M1), Formula 2 (M2) and Formula 3 (M3) of about 30 to about 80 mol %: about 10 to about 30 mol %: about 10 to about 40 mol %.

In some embodiments, the polycarbonate may include a unit of Formula 1 in an amount of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the unit of Formula 1 can be in a range from about any of the foregoing amounts to about any other of the foregoing amounts.

In some embodiments, the polycarbonate may include a unit of Formula 2 in an amount of 10, 11, 12, 13, 14, 15, 16, 17, 18, 19, 20, 21, 22, 23, 24, 25, 26, 27, 28, or 30 mol %. Further, according to some embodiments of the present invention, the amount of the unit of Formula 2 can be in a range from about any of the foregoing amounts to about any other of the foregoing amounts.

In some embodiments, the polycarbonate may include a unit of Formula 3 in an amount of 10, 11, 12, 13, 14, 15, 16, 17, 18, 19, 20, 21, 22, 23, 24, 25, 26, 27, 28, 30, 31, 32, 33, 34, 35, 36, 37, 38, 39, or 40 mol %. Further, according to some embodiments of the present invention, the amount of the unit of Formula 3 can be in a range from about any of the foregoing amounts to about any other of the foregoing amounts.

When the polycarbonate has a mole ratio of the units of Formula 1 (M1), Formula 2 (M2) and Formula 3 (M3) within this range, the polycarbonate can exhibit excellent fluidity, impact strength and chemical resistance, and particularly can obtain superior practical fluidity, impact strength at low temperature and chemical resistance. In exemplary embodiments, the polycarbonate may have a notched IZOD impact strength of about 55 to about 85 kg·cm/cm, as measured on a ⅛" thick specimen at −30° C. according to ASTM D542.

In one embodiment, the polycarbonate may have a mole ratio of Formula 1 (M1), Formula 2 (M2) and Formula 3 (M3) which satisfies the following conditions:

$$M1 \geq M2$$

and $$M2 \leq M3,$$

wherein M1 is a mole ratio of Formula 1, M2 is a mole ratio of Formula 2 and M3 is a mole ratio of Formula 3.

In exemplary embodiments, M1>M2, and in other exemplary embodiments, M1>M2+M3. In this case, heat resistance and impact strength at room temperature can be particularly excellent.

The mole ratio of M2 to M3 may be about 1:1 to about 1:2. When the mole ratio of M2 to M3 is within this range, excellent chemical resistance can be obtained.

The polycarbonate resin prepared according to the present invention can have excellent chemical resistance, fluidity and impact strength, and thus may be used in various products. For example, the polycarbonate resin may be used for automobiles, machine parts, electric and electronic components, office machines including computers, and the like. The polycarbonate resin may be employed not only for housings of electric and electronic products, such as TVs, computers, printers, washing machines, cassette players, stereos, cellular phones, game consoles and toys, but for humidifiers, steam vacuum cleaners, steam irons, and the like.

The polycarbonate resin may be formed into a product using suitable molding techniques, for example, extrusion molding, injection molding, vacuum molding, casting molding, blow molding and calendar molding. These methods are generally known to a person having ordinary knowledge in the art.

The present invention will be explained in more detail with reference to the following examples. These examples are provided for illustrative purposes only and are not to be in any way construed as limiting the present invention.

EXAMPLE 1

4.05 kg of 2,2-bis(4-hydroxyphenyl)propane (bisphenol A or BPA), 0.19 kg of 4,4'-biphenyl (BP), 0.14 kg of 1,4-cyclohexanedimethanol (CHDM), 4.35 kg of diphenyl carbonate and 150 ppb of KOH (based on 1 mol of bisphenol A) are sequentially added to a reactor, and oxygen in the reactor is removed using nitrogen. The reactor is heated to 160° C. and then to 190° C., at which temperature the reaction is performed for 6 hours. After 6 hours, the reactor is heated to 210° C. and maintained at 100 Torr for 1 hour. The reactor is heated to 260° C. and maintained at 20 Torr for 1 hour, and then is decompressed to 0.5 Torr and maintained for 1 hour. Then, 0.0005 phr of dodecyl p-toluene sulfonate, 0.03 phr of octadecyl 3-(3,5-di-tert-4-hydroxyphenyl)propionate and 0.05 phr of tris(2,4-di-tert-butylphenyl)phosphate are added to the melt polymer and mixed to form a uniform mixture for about 10 minutes.

EXAMPLE 2

3.83 kg of 2,2-bis(4-hydroxyphenyl)propane (bisphenol A), 0.19 kg of 4,4'-biphenyl, 0.28 kg of 1,4-cyclohexanedimethanol, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

EXAMPLE 3

3.60 kg of 2,2-bis(4-hydroxyphenyl)propane (bisphenol A), 0.37 kg of 4,4'-biphenyl, 0.28 kg of 1,4-cyclohexanedimethanol, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

EXAMPLE 4

3.15 kg of 2,2-bis(4-hydroxyphenyl)propane (bisphenol A), 0.37 kg of 4,4'-biphenyl, 0.57 kg of 1,4-cyclohexanedimethanol, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

EXAMPLE 5

2.25 kg of 2,2-bis(4-hydroxyphenyl)propane (bisphenol A), 0.74 kg of 4,4'-biphenyl, 0.85 kg of 1,4-cyclohexanedimethanol, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

EXAMPLE 6

1.35 kg of 2,2-bis(4-hydroxyphenyl)propane (bisphenol A), 1.11 kg of 4,4'-biphenyl, 0.85 kg of 1,4-cyclohexanedimethanol, 1.13 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

Comparative Example 1

4.5 kg of 2,2-bis(4-hydroxyphenyl)propane (bisphenol A), 4.35 kg of diphenyl carbonate and 100 ppb of KOH (based on 1 mol of bisphenol A) are sequentially added to a reactor, and oxygen in the reactor is removed using nitrogen. The reactor is heated to 160° C. and then to 190° C., at which temperature the reaction is performed for 6 hours. After 6 hours, the reactor is heated to 220° C. and maintained at 70 Torr for 1 hour. The reactor is heated to 260° C. and maintained at 20 Torr for 1 hour, and then is decompressed to 0.5 Torr and maintained for 1 hour. Then, 0.0005 phr of dodecyl p-toluene sulfonate, 0.03 phr of octadecyl 3-(3,5-di-tert-4-hydroxyphenyl)propionate and 0.05 phr of tris(2,4-di-tert-butylphenyl) phosphate are added to the melt polymer and mixed to form a uniform mixture for about 10 minutes.

Comparative Example 2

3.83 kg of 2,2-bis(4-hydroxyphenyl)propane (bisphenol A), 0.56 kg of 4,4'-biphenyl, 4.35 kg of diphenyl carbonate and 100 ppb of KOH (based on 1 mol of bisphenol A) are sequentially added to a reactor, and oxygen in the reactor is removed using nitrogen. Then, polymerization is performed in the same manner as in Comparative Example 1.

Comparative Example 3

3.15 kg of 2,2-bis(4-hydroxyphenyl)propane (bisphenol A), 1.11 kg of 4,4'-biphenyl, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Comparative Example 1.

Comparative Example 4

4.05 kg of 2,2-bis(4-hydroxyphenyl)propane (bisphenol A), 0.28 kg of 4,4'-biphenyl, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

Comparative Example 5

3.15 kg of 2,2-bis(4-hydroxyphenyl)propane (bisphenol A), 0.85 kg of 1,4-cyclohexanedimethanol, 4.35 kg of diphenyl carbonate and 150 ppb of KOH (based on 1 mol of bisphenol A) are sequentially added to a reactor, and oxygen in the reactor is removed using nitrogen. Then, polymerization is performed in the same manner as in Example 1.

The polycarbonate resins prepared in the Examples and Comparative Examples are extruded using a biaxial extruder (L/D=36, φ=32) at 270° C. and formed into pellets using a pelletizer. Physical properties of the prepared pellets are evaluated as follows and results are shown in Table 2.

Evaluation Methods of Physical Properties (1) Melt Index (MI, g/10 min)

Melt index is measured at 250° C. and a load of 10 kg using a flow index tester (Model No: F-W01, Manufactured by Toyoseiki).

(2) Glass Transition Temperature (° C.)

Glass transition temperature is measured at a temperature increase rate of 10° C. per minute using DSC (Model No.: Q100, TA Instruments)

(3) Index of Refraction

An index of refraction is measured according to ASTM D257.

(4) Practical Fluidity (cm)

A practically flowing distance (cm) of the pellets in a 2 mm-thick spiral mold at 290° C. and a mold temperature of 80° C. is measured using an injection machine (DHC 120 WD, 120 ton, Dongshin en-Tech Co., Ltd.).

(5) Impact Strength at Room Temperature (kgf·cm/cm)

The prepared pellets are formed into a ⅛" IZOD specimen at a molding temperature of 270° C. and a mold temperature of 70° C. using an injection machine (DHC 120 WD, 120 ton, Dongshin en-Tech Co., Ltd.), followed by evaluation according to ASTM D256 (⅛", notched).

(6) Impact Strength at Low Temperature (kgf·cm/cm)

Impact strength at low temperature is measured on a ⅛" IZOD specimen at −30° C. according to ASTM D542.

(7) Chemical Resistance

*Chemical resistance to alcohols: A tensile specimen in accordance with ASTM D638 is prepared via injection molding, after which a 2.1% strain is applied to the specimen according to ASTM D543 for evaluating Environmental Stress Crack Resistance and methanol and isopropyl alcohol are dropped thereto. After 10 minutes, cracks generated on a curved part are observed. (⊚: No Crack, o: Fine cracks, Δ: Many cracks, X: Haze of cracks)

*Transmittance after depositing in coating solution: A 2.5 mm flat specimen is deposited in a coating thinner (main ingredients: methyl isobutyl ketone, cyclohexanone, 2-ethoxyethanol) for a polycarbonate resin for 2 minutes and dried at 80° C. for 30 minutes, followed by measurement of visible transmittance (%) using a hazemeter (Gmbh 4725, BYK-Gardner)

TABLE 1

| | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| BPA (mol %) | 90 | 85 | 80 | 70 | 50 | 30 | 100 | 85 | 70 | 90 | 70 |
| BP (mol %) | 5 | 5 | 10 | 10 | 20 | 30 | — | 15 | 30 | — | — |
| CHDM (mol %) | 5 | 10 | 10 | 20 | 30 | 40 | — | — | — | 10 | 30 |
| Antioxidant (phr) | 0.03 | 0.03 | 0.03 | 0.03 | 0.03 | 0.03 | 0.03 | 0.03 | 0.03 | 0.03 | 0.03 |
| Phosphorus heat stabilizer (phr) | 0.05 | 0.05 | 0.05 | 0.05 | 0.05 | 0.05 | 0.05 | 0.05 | 0.05 | 0.05 | 0.05 |

TABLE 2

| | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| MI | 30 | 30 | 30 | 30 | 30 | 30 | 30 | 30 | 30 | Unmeasurable | Unmeasurable |
| Tg (° C.) | 148 | 140 | 142 | 125 | 120 | 112 | 148 | 152 | 155 | 137 | 119 |
| Index of refraction | 1.585 | 1.586 | 1.588 | 1.588 | 1.592 | 1.596 | 1.584 | 1.590 | 1.595 | 1.582 | 1.578 |
| Practical fluidity (cm) | 28.7 | 30.5 | 29.5 | 36.5 | 39.0 | 41.2 | 28.5 | 25 | 22 | 30.5 | 35.0 |
| Impact strength at room temperature (⅛") | 69 | 70 | 72 | 68 | 66 | 63 | 73 | 52 | 41 | 50 | 7 |
| Impact strength at room temperature (−30° C.) (⅛") | 14 | 36 | 65 | 63 | 64 | 61 | 13 | 42 | 39 | 12 | 6 |
| Chemical resistance — Alcohols | ○ | ◎ | ◎ | ◎ | ◎ | ◎ | X | ◎ | ◎ | △ | ○ |
| Chemical resistance — Transmittance after depositing in coating solution (%) | 80 | 88 | 88 | 88 | 88 | 88 | <30 | 88 | 88 | 70 | 85 |

During testing, the melt indices (MI) of the polycarbonates according to Examples 1 to 6 and Comparative Examples 1 to 3 are adjusted to 30 g/10 min. The polycarbonates according to Comparative Examples 4 and 5 have unmeasurably high MIs at 250° C. and a load of 10 kg. The polycarbonates according to Examples 1 to 6 have excellent fluidity, impact strength at room temperature and low temperature, chemical resistance and transmittance. However, the polycarbonate using BPA only according to Comparative Example 1 exhibits significantly reduced chemical resistance, and the polycarbonates not employing an alicyclic diol according to Comparative Examples 2 and 3 have lowered impact strength at room temperature and practical fluidity. The polycarbonates not using BP according to Comparative Examples 4 and 5 have excellent practical fluidity but exhibit reduced impact strength at room temperature and low temperature. In particular, the polycarbonate according to Comparative Example 4 has deteriorated chemical resistance as well.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. Polycarbonate comprising repeat units represented by Formula 1, Formula 2 and Formula 3, respectively:

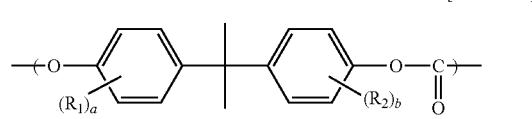

[Formula 1]

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4;

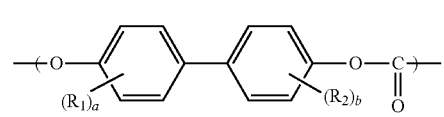

[Formula 2]

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4; and

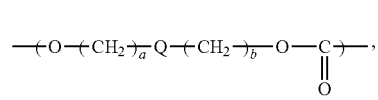

[Formula 3]

wherein:
Q is substituted or unsubstituted C5 to C10 cycloalkyl, and
a and b are the same or different and are each independently an integer from 0 to 4.

2. The polycarbonate of claim 1, wherein the polycarbonate has a mole ratio of Formula 1 (M1), Formula 2 (M2) and Formula 3 (M3) of about 30 to about 90 mol %: about 5 to about 30 mol %: about 5 to about 40 mol %.

3. The polycarbonate of claim 1, wherein the polycarbonate has a mole ratio of Formula 1 (M1), Formula 2 (M2) and Formula 3 (M3) of about 75 to about 90 mol %: about 5 to about 15 mol %: about 5 to about 15 mol %.

4. The polycarbonate of claim 1, wherein the polycarbonate has a mole ratio of Formula 1 (M1), Formula 2 (M2) and Formula 3 (M3) of about 30 to about 80 mol %: about 10 to about 30 mol %: about 10 to about 40 mol %.

5. The polycarbonate of claim 1, wherein the polycarbonate has a mole ratio of Formula 1 (M1), Formula 2 (M2) and Formula 3 (M3) which satisfies conditions as follows:

$M1 > M2 + M3;$ and $M2 \leq M3,$ wherein M1 is a mole ratio of Formula 1, M2 is a mole ratio of Formula 2 and M3 is a mole ratio of Formula 3.

6. The polycarbonate of claim 3, wherein the polycarbonate has a glass transition temperature of about 135 to about 160° C., an index of refraction of about 1.58 to about 1.59 and a notched IZOD impact strength of about 65 to about 95 kg·cm/cm, as measured on a ⅛" thick specimen at room temperature according to ASTM D256.

7. The polycarbonate of claim 4, wherein the polycarbonate has a notched IZOD impact strength of about 55 to about 85 kg·cm/cm, as measured on a ⅛" thick specimen at −30° C. according to ASTM D542.

8. The polycarbonate of claim 1, wherein the polycarbonate comprises a sulfonic acid compound represented by Formula 4:

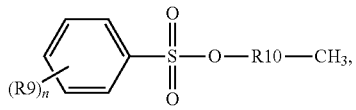

[Formula 4]

wherein:
each R9 is the same or different and each is independently substituted or unsubstituted C1 to C20 alkyl,
R10 is substituted or unsubstituted C11 to C20 alkylene, and
n is an integer from 0 to 5.

9. A method of preparing polycarbonate comprising transesterification of diols represented by Formula 1-1, Formula 2-1 and Formula 3-1 with diaryl carbonate:

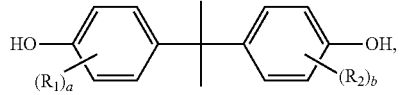

[Formula 1-1]

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4;

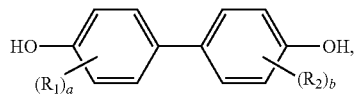

[Formula 2-1]

wherein:
$R_1$ and $R_2$ are the same or different and are each independently substituted or unsubstituted C1 to C6 alkyl, substituted or unsubstituted C3 to C6 cycloalkyl, substituted or unsubstituted C6 to C12 aryl or halogen, and
a and b are the same or different and are each independently an integer from 0 to 4; and

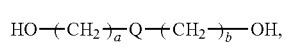

[Formula 3-1]

wherein:
Q is substituted or unsubstituted C5 to C10 cycloalkyl, and
a and b are the same or different and are each independently an integer from 0 to 4.

10. The method of claim 9, wherein a mole ratio of Formula 1-1, Formula 2-1 and Formula 3-1 is about 30 to about 90 mol %: about 5 to about 30 mol %: about 5 to about 40 mol %.

11. The polycarbonate of claim 1, wherein the repeat unit represented by Formula 3 is derived from a diol represented by Formula 3-1:

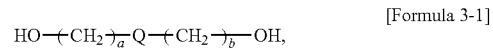

[Formula 3-1]

wherein Q, a, and b are the same as defined in claim 1.

12. The polycarbonate of claim 11, wherein the repeat unit represented by Formula 3 is derived from a diol comprising 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cycloheptanediol, 1,3-cycloheptanediol, 1,4-cycloheptanediol, 1,2-cyclooctanediol, 1,3-cyclooctanediol, 1,4-cyclooctanediol, or a combination thereof.

13. The polycarbonate of claim 12, wherein the repeat unit represented by Formula 3 is derived from a diol comprising 1,4-cyclohexanedimethanol.

14. The polycarbonate of claim 11, wherein the repeat unit represented by Formula 1 is derived from a diol represented by Formula 1-1:

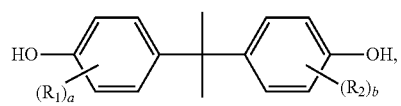

[Formula 1-1]

wherein $R_1$, $R_2$, a, and b are the same as defined in claim 1.

15. The polycarbonate of claim 14, wherein the repeat unit represented by Formula 1 is derived from a diol comprising 2,2-bis-(4-hydroxyphenyl)-propane (bisphenol A), 2,2-bis-(3,5-dimethyl-4-hydroxyphenyl)-propane, 2,2-bis-(3,5-diisopropyl-4-hydroxyphenyl)-propane, or a combination thereof.

16. The polycarbonate of claim 15, wherein the repeat unit represented by Formula 1 is derived from a diol comprising 2,2-bis-(4-hydroxyphenyl)-propane.

17. The polycarbonate of claim 14, wherein the repeat unit represented by Formula 2 is derived from a diol represented by Formula 2-1:

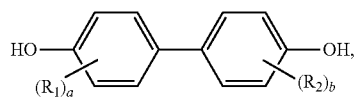

[Formula 2-1]

wherein $R_1$, $R_2$, a, and b are the same as defined in claim 1.

18. The polycarbonate of claim 17, wherein the repeat unit represented by Formula 2 is derived from a diol comprising 4,4'-biphenol, 2,2'-dimethyl-4,4'-biphenyldiol, 3,3'-dimethyl-4,4-dihydroxybiphenyl, 2,2',6,6'-tetramethyl-4,4'-biphenol, or a combination thereof.

19. The polycarbonate of claim 18, wherein the repeat unit represented by Formula 2 is derived from a diol comprising 4,4'-biphenol.

* * * * *